US012579811B2

(12) United States Patent
Yu et al.

(10) Patent No.: US 12,579,811 B2
(45) Date of Patent: Mar. 17, 2026

(54) DEVICE AND METHOD FOR DEGRADATION PREDICTION

(71) Applicant: DOOSAN ENERBILITY CO., LTD., Changwon (KR)

(72) Inventors: Jun Sang Yu, Seongnam (KR); Jung Min Lee, Seoul (KR)

(73) Assignee: DOOSAN ENERBILITY CO., LTD, Changwon (KR)

( * ) Notice: Subject to any disclaimer, the term of this patent is extended or adjusted under 35 U.S.C. 154(b) by 297 days.

(21) Appl. No.: 18/468,705

(22) Filed: Sep. 16, 2023

(65) Prior Publication Data

US 2024/0144685 A1     May 2, 2024

(30) Foreign Application Priority Data

Oct. 31, 2022     (KR) ......................... 10-2022-0142956

(51) Int. Cl.
G06V 20/50          (2022.01)
G06T 7/00          (2017.01)
          (Continued)

(52) U.S. Cl.
CPC .............. G06V 20/50 (2022.01); G06T 7/001 (2013.01); G06V 10/751 (2022.01);
          (Continued)

(58) Field of Classification Search
CPC .... G06V 20/50; G06V 10/751; G06V 10/762; G06V 10/7715; G06V 10/774;
          (Continued)

(56) References Cited

U.S. PATENT DOCUMENTS

2019/0184494 A1*   6/2019   Bennett ................ B23K 26/146

FOREIGN PATENT DOCUMENTS

AU          2020101874 A4      9/2020

OTHER PUBLICATIONS

Zhang, Xiao-Cheng, Jian-Guo Gong, and Fu-Zhen Xuan. "A deep learning based life prediction method for components under creep, fatigue and creep-fatigue conditions." International Journal of Fatigue 148 (2021): 106236.https://www.sciencedirect.com/science/article/pii/S0142112321000967 (Year: 2021).*

(Continued)

*Primary Examiner* — Han Hoang
(74) *Attorney, Agent, or Firm* — Harvest IP Law, LLP

(57)          ABSTRACT

Disclosed is a degradation prediction device predicting a lifetime of a target material, including: at least one processor, and the at least one processor is configured to train a degradation index prediction model based on the representative value of a degradation index of a material by environmental conditions and the environmental information of a material subjected to a destructive testing, train a LMP (Larson-Miller Parameter) value prediction model based on the representative value of a degradation index of a material by environmental conditions and a theoretical value of LMP at a destructive testing, predict a degradation index for a target material using the degradation index prediction model for which training is completed based on environmental information of the target material and predict a LMP value of the target material using the LMP value prediction model for which training is completed based on the predicted degradation index.

15 Claims, 7 Drawing Sheets

(51) Int. Cl.
| | |
|---|---|
| *G06V 10/75* | (2022.01) |
| *G06V 10/762* | (2022.01) |
| *G06V 10/77* | (2022.01) |
| *G06V 10/774* | (2022.01) |
| *G06V 10/776* | (2022.01) |

(52) U.S. Cl.
CPC ........ *G06V 10/762* (2022.01); *G06V 10/7715* (2022.01); *G06V 10/774* (2022.01); *G06V 10/776* (2022.01); *G06T 2207/20021* (2013.01); *G06T 2207/20081* (2013.01); *G06T 2207/30108* (2013.01)

(58) Field of Classification Search
CPC .. G06V 10/776; G06V 20/698; G06V 10/476; G06T 7/001; G06T 2207/20021; G06T 2207/20081; G06T 2207/30108; G06T 2207/10061; G06T 2207/30136; G06T 7/0004; G06T 7/10; G06T 7/60; G01N 21/88; G01N 21/8914; G01N 2021/8918; G01N 21/8851; G01N 2021/8858; G01N 2021/8883; G01N 2021/8887; G01N 2201/1296; G06N 3/08
See application file for complete search history.

(56) References Cited

OTHER PUBLICATIONS

Xu, Jinghui, et al. "Fast characterization framework for creep microstructure of a nickel-based SX superalloy with high-throughput experiments and deep learning methods." Materials Characterization 187 (2022): 111857.https://www.sciencedirect.com/science/article/pii/S1044580322001395 (Year: 2022).*

Kim, Seen Chan, et al. "Short-term creep data based long-term creep life predictability for grade 92 steels and its microstructural basis." Metals and Materials International 25.3 (2019): 713-722. https://link.springer.com/article/10.1007/s12540-018-00214-x (Year: 2019).*

A Search Report issued by the European Patent Office.

A deep learning based life prediction method for components under creep, fatigue and creep-fatigue conditions. Xiao-Cheng et al.

AI-Based Degradation Index from the Microstructure Image and Life Prediction Models Based on Bayesian Inference, Junsang Yu et al.

* cited by examiner

FIG. 2

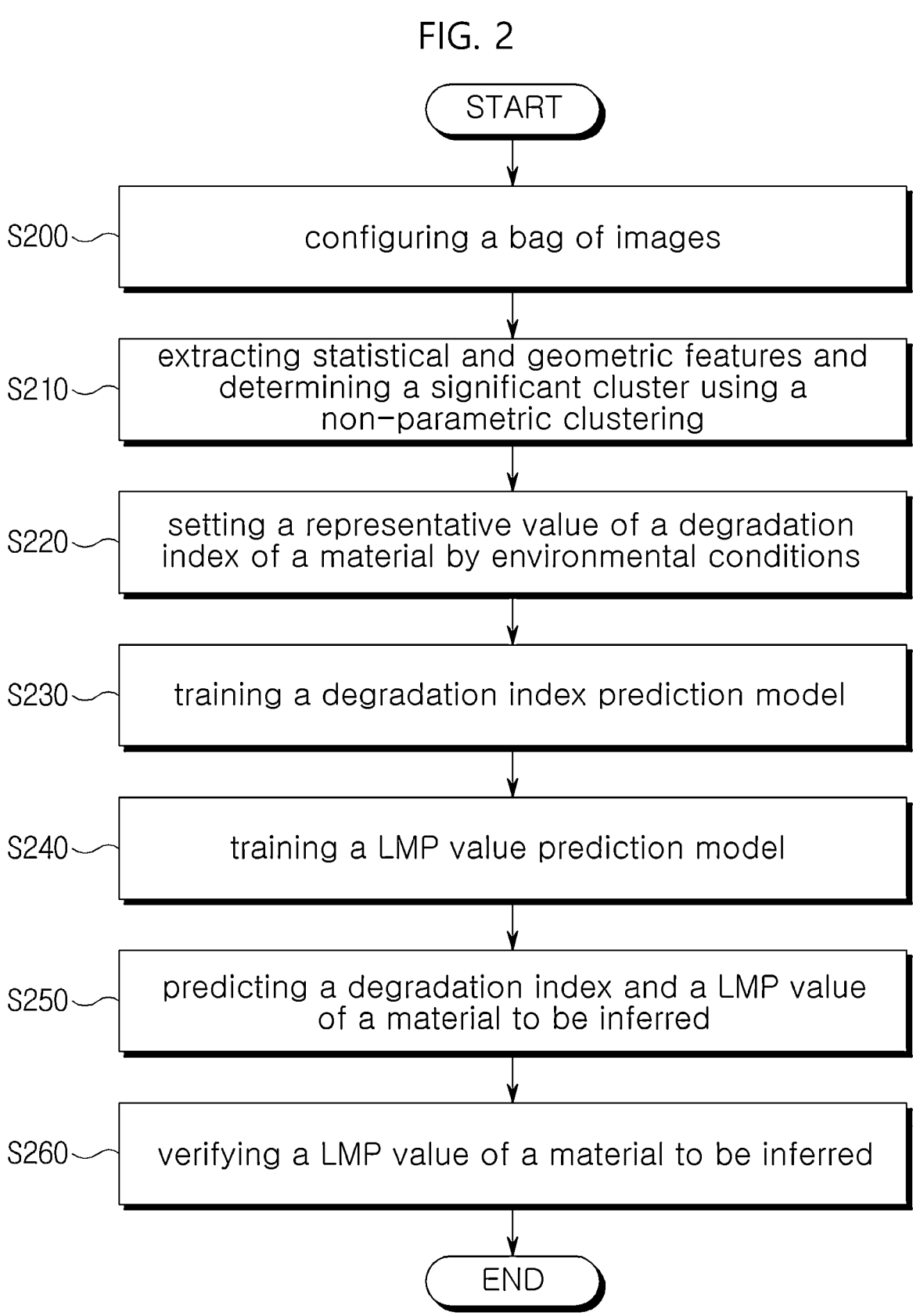

START

S200 — configuring a bag of images

S210 — extracting statistical and geometric features and determining a significant cluster using a non-parametric clustering S220 — setting a representative value of a degradation index of a material by environmental conditions S230 — training a degradation index prediction model S240 — training a LMP value prediction model S250 — predicting a degradation index and a LMP value of a material to be inferred S260 — verifying a LMP value of a material to be inferred

END

FIG. 3A

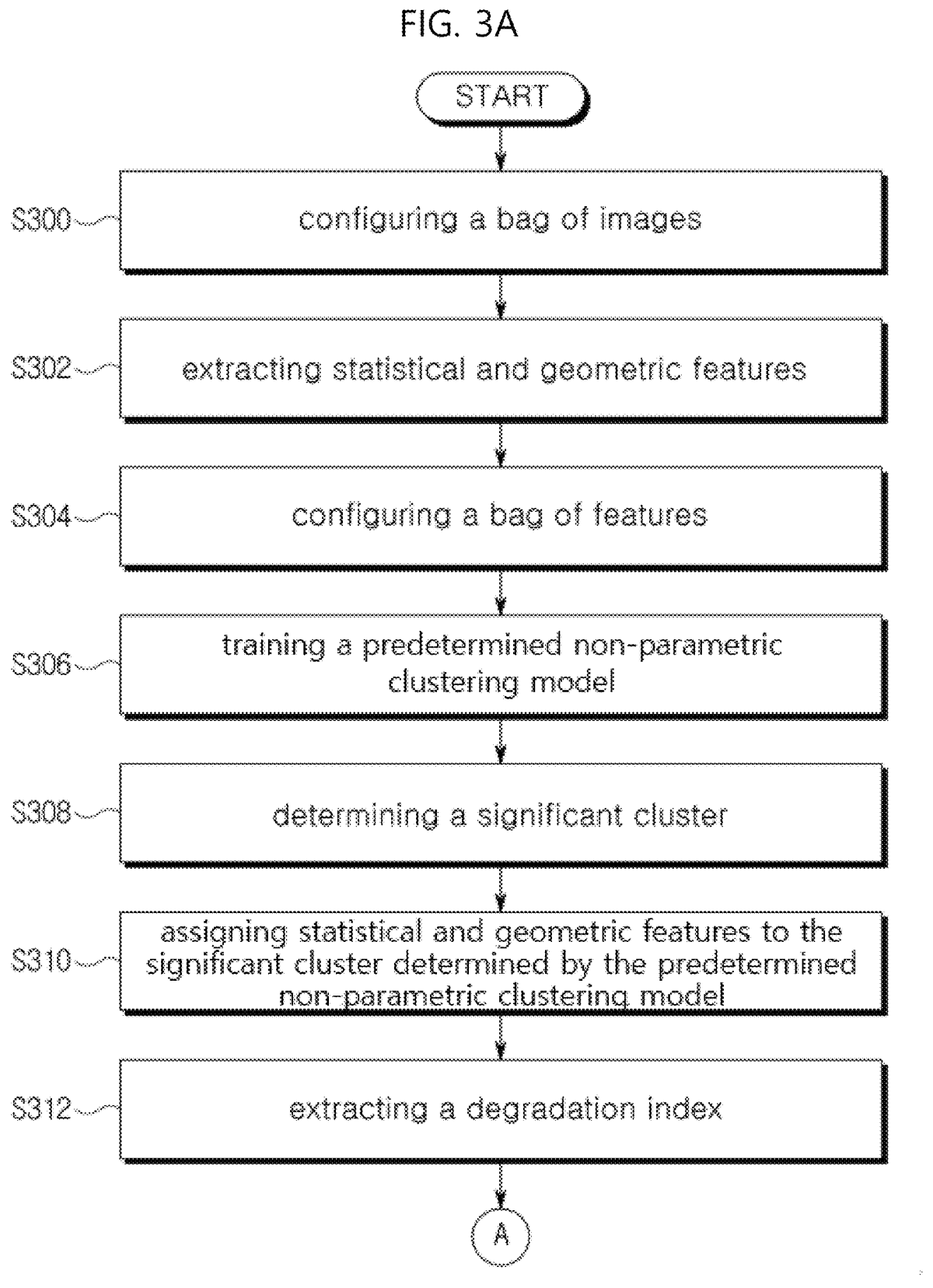

START

S300 — configuring a bag of images

S302 — extracting statistical and geometric features

S304 — configuring a bag of features

S306 — training a predetermined non-parametric clustering model

S308 — determining a significant cluster

S310 — assigning statistical and geometric features to the significant cluster determined by the predetermined non-parametric clustering model S312 — extracting a degradation index

Figure 3B:
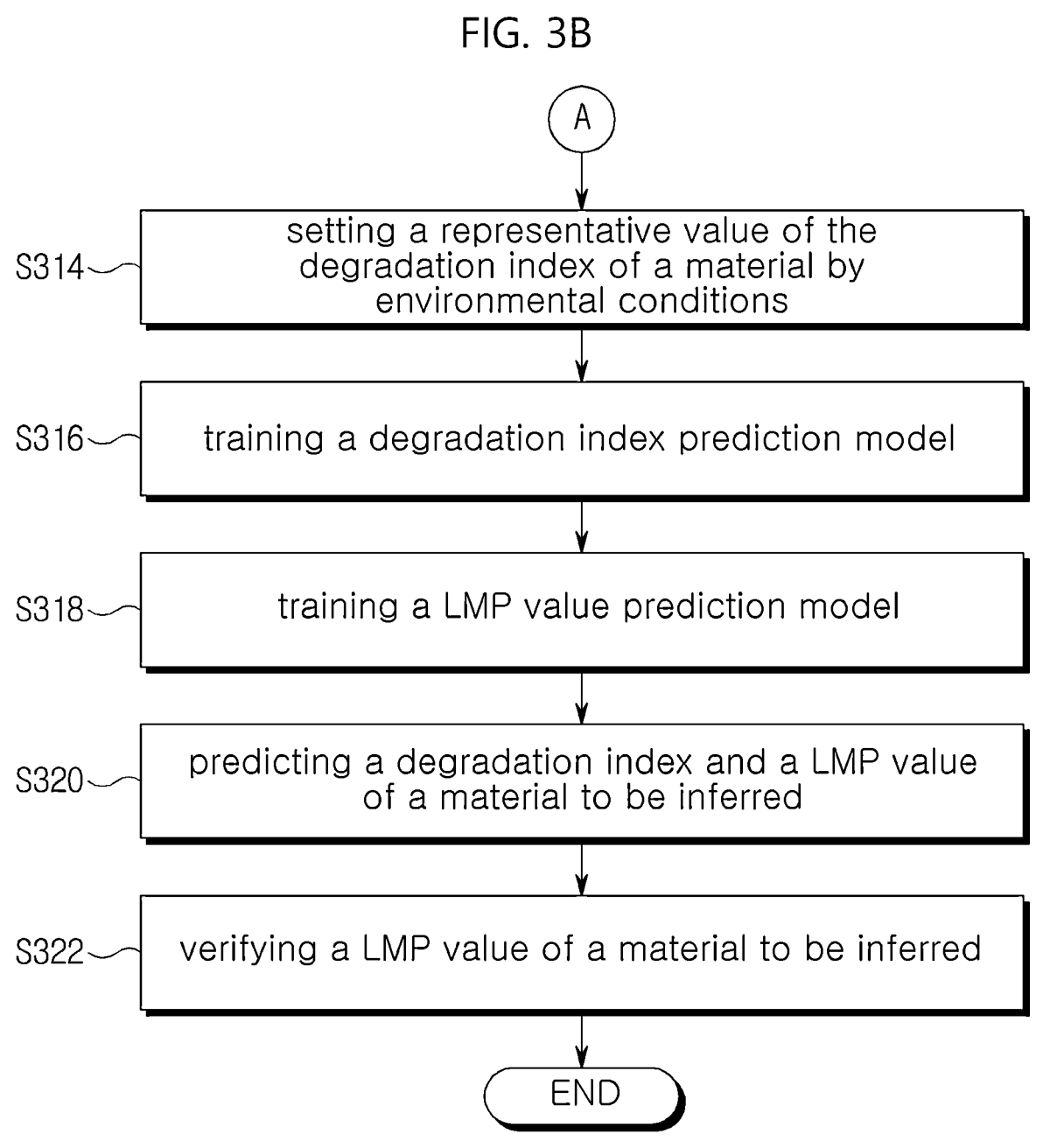

S314 — setting a representative value of the degradation index of a material by environmental conditions S316 — training a degradation index prediction model S318 — training a LMP value prediction model S320 — predicting a degradation index and a LMP value of a material to be inferred S322 — verifying a LMP value of a material to be inferred

END

FIG. 4 extract as many features as the number of γ′ structures with respect to one image.
(Ex: the number of γ′ structures/image : 400)

| index | Contour Perimeter | Contour area | Convexhull perimeter | Convexhull area | Aspect Ratio | elongation | Compactness | solidity | extent | eccentricity | angle | equivalent diameter |
|---|---|---|---|---|---|---|---|---|---|---|---|---|
| 100 | 130.12 | 1143.5 | 125.22 | 1178.5 | 1.1601 | 0.8473 | 1.1783 | 0.9703 | 0.7751 | 0.7916 | 45 | 38.169 |
| 321 | 196.89 | 1153.5 | 151.15 | 1504.5 | 0.5637 | 0.5637 | 2.6744 | 0.7666 | 0.6656 | 0.5083 | 7.5946 | 38.3233 |

FIG. 5

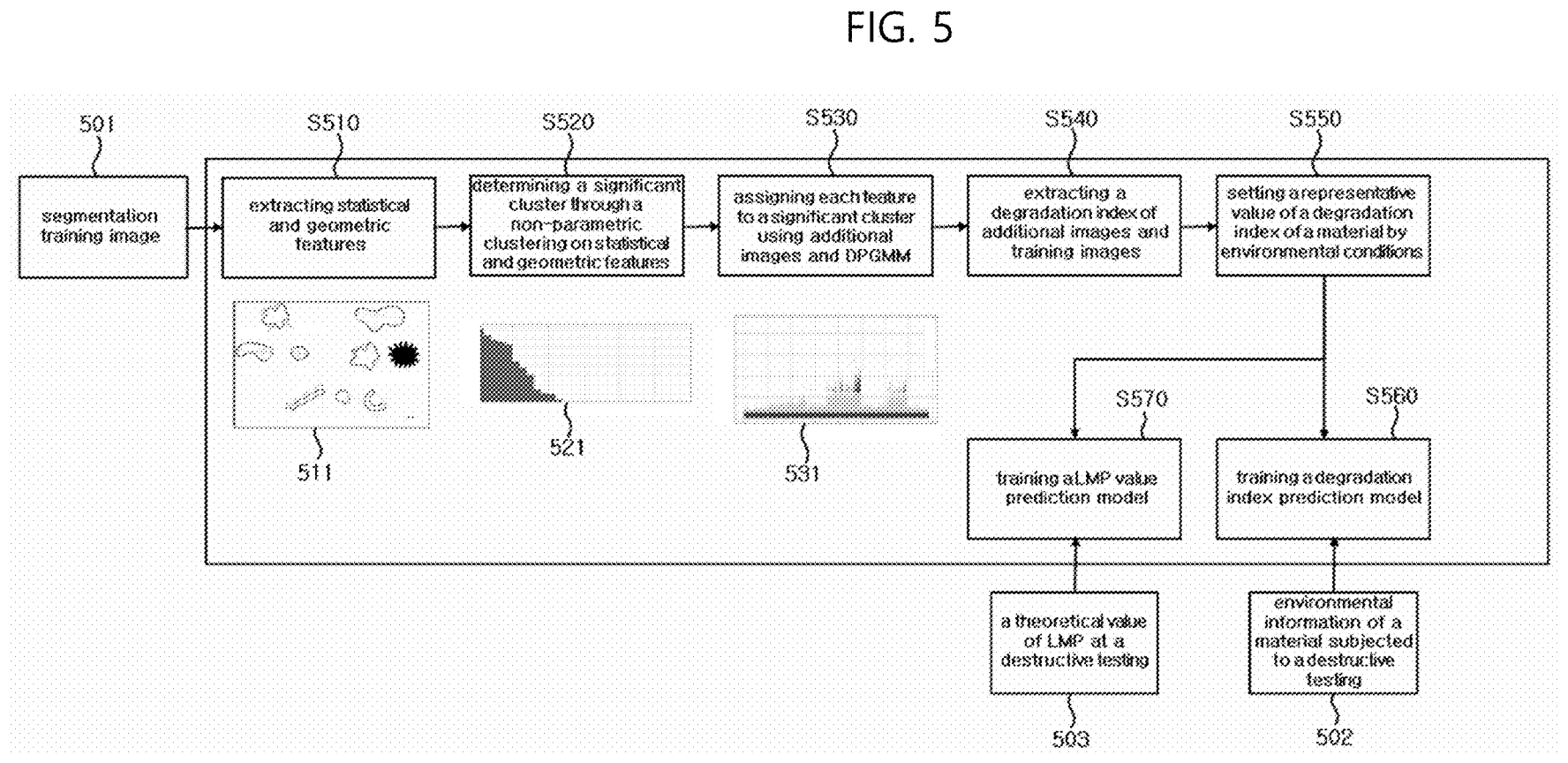

S510 — segmentation training image — 501

S510 — extracting statistical and geometric features — 511

S520 — determining a significant cluster through a non-parametric clustering on statistical and geometric features — 521

S530 — assigning each feature to a significant cluster using additional images and DPGMM — 531

S540 — extracting a degradation index of additional images and training images

S550 — setting a representative value of a degradation index of a material by environmental conditions S560 — training a degradation index prediction model S570 — training a LMP value prediction model 502 — environmental information of a material subjected to a destructive testing 503 — a theoretical value of LMP at a destructive testing

DEVICE AND METHOD FOR DEGRADATION PREDICTION

CROSS REFERENCE TO RELATED APPLICATION

The present application claims priority to Korea Patent Application No. 10-2022-0142956, filed on Oct. 31, 2022, the entire contents of which is incorporated herein for all purposes by this reference.

FIELD

Various embodiments relate to a degradation prediction device and a degradation prediction method.

BACKGROUND

In general, power plants and mechanical facilities predominantly employ metal materials. Overtime, these materials may experience gradual degradation when exposed to high temperatures or used for a long time.

For example, when a metal material is used at a high temperature for a long time, the material strength of the metal material can decrease to a level below the intended design strength, leading to structural damage. Therefore, in order to secure the stability of equipment made of metal materials, it is necessary to undertake repairs and replacement at suitable intervals of time.

In the conventional evaluation or assessment of metal material degradation or deterioration, an expert in a field related to metal materials visually observes and examines an image taken with an electron microscope such as an SEM (scanning electron microscope). These assessments often involve the destruction of the metal material to determine its level of deterioration or degradation.

SUMMARY

An object of the present disclosure is to provide a degradation prediction device and a degradation prediction method capable of predicting a degradation index and an LMP value only with environmental information of a material, by developing the degradation index of a device through a microstructure image obtained through a destructive testing and connecting the environmental information of a material and the degradation index to a regression model, without destroying the device or parts.

One embodiment of the present disclosure is a degradation prediction device for a target material of a component in a plant, including at least one processor, an input/output interface, and a memory configured to store a program.

The at least one processor is configured to, when executing instructions in the program, configure a bag of images for training based on a microstructure image of a material subjected to a destructive testing, extract features of each image included in the bag of images, determine at least one significant cluster through clustering on the extracted features of each image included in the bag of images using a predetermined non-parametric clustering model, extract at least one degradation index by assigning features of additional microstructure images and the features of each image included in the bag of images subjected to the clustering to the determined at least one significant cluster using the predetermined non-parametric clustering model, set a representative value of a degradation index of the material by environmental conditions based on the extracted degradation index and an environmental information of the material, train a degradation index prediction model based on the representative value of the degradation index of the material by the environmental conditions and the environmental information of the material, train a LMP (Larson-Miller Parameter) value prediction model based on the representative value of the degradation index of the material by the environmental conditions and a theoretical value of LMP at a destructive testing, predict a degradation index for the target material using the degradation index prediction model for which training is completed based on environmental information of the target material, and predict a LMP value of the target material using the LMP value prediction model for which training is completed based on the predicted degradation index.

In addition, the at least one processor may verify the LMP value of the target material by comparing a LMP value predicted based on a microstructure image of a replica with the predicted LMP value of the target material.

In addition, the at least one processor may configure the bag of images for training based on a predetermined segmentation prediction model.

In addition, the at least one processor may extract statistical and geometric features of each of the microstructure images; configure a bag of features based on the extracted statistical and geometric features of each of the microstructure images; train a predetermined non-parametric clustering model to determine at least one significant cluster through a clustering on statistical and geometric features of each image included in the bag of images, based on the configured bag of features; and determine at least one significant cluster through a clustering on statistical and geometric features of each image included in the bag of images using the predetermined non-parametric clustering model for which training is completed.

In addition, the at least one processor may assign the statistical and geometric features of each image included in the bag of images subjected to the clustering and the additional microstructure images to at least one significant cluster determined by the predetermined non-parametric clustering model for which training is completed, using the predetermined non-parametric clustering model for which training is completed; extract a degradation index for each of images included in the bag of images and the additional microstructure images using a predetermined method based on an expected value of statistical and geometric features assigned to the at least one significant cluster; and set a representative value of a degradation index of a material by environmental conditions using a predetermined model based on an average of the extracted degradation index.

In addition, the environmental information of the material subjected to a destructive testing and the environmental information of the target material are input via the input/output interface.

In addition, the at least one processor is further configured to generate an alert signal based on the predicted LMP value of the target material via the input/output interface.

Another embodiment of the present disclosure is a method for predicting degradation of a target material of a component in a plant, including configuring a bag of images for training based on a microstructure image of the material subjected to a destructive testing, extracting features of each image included in the bag of images, determining at least one significant cluster through a clustering on the extracted features of each image included in the bag of images using a predetermined non-parametric clustering model, extracting a degradation index by assigning features of additional microstructure images and features of each image included in the bag of images subjected to the clustering to the determined at least one significant cluster using the predetermined non-parametric clustering model, setting a representative value of a degradation index of the material by environmental conditions based on the extracted degradation index and an environmental information of the material, training a degradation index prediction model based on the representative value of the degradation index of the material by environmental conditions and the environmental information of the material; training a LMP value prediction model based on the representative value of the degradation index of the material by the environmental conditions and a theoretical value of LMP at a destructive testing; predicting a degradation index for the target material using the degradation index prediction model for which training is completed based on environmental information of the target material, and predicting a LMP value of the target material using the LMP value prediction model for which training is completed based on the predicted degradation index for the target material.

In addition, the method for predicting degradation of a target material may further include: verifying a LMP value of the target material by comparing a predicted LMP value predicted based on a microstructure image of a replica with the predicted LMP value of the target material.

In addition, the configuring a bag of images for training may include configuring the bag of images for training based on a predetermined segmentation prediction model.

In addition, the determining at least one significant cluster through a clustering on features of each microstructure images included in the bag of images may include extracting statistical and geometric features of each of the microstructure images, configuring a bag of features based on the extracted statistical and geometric features of each of the microstructure images, training a predetermined non-parametric clustering model to determine at least one significant cluster through a clustering on statistical and geometric features of each image included in the bag of images, based on the configured bag of features; and determining at least one significant cluster through a clustering on statistical and geometric features of each image included in the bag of images using the predetermined non-parametric clustering model for which training is completed.

In addition, the setting a representative value of a degradation index of a material by environmental conditions may include: assigning the statistical and geometric features of each image included in the bag of images subjected to the clustering and the additional microstructure images to at least one significant cluster determined by the predetermined non-parametric clustering model for which training is completed, using the predetermined non-parametric clustering model for which training is completed; extracting a degradation index for each of images included in the bag of images and the additional microstructure images using a predetermined method based on an expected value of statistical and geometric features assigned to the at least one significant cluster; and setting a representative value of a degradation index of a material by environmental conditions using a predetermined model based on an average of the extracted degradation index. The present disclosure has an effect of predicting a degradation index and a LMP value only with environmental information of a material.

In addition, the environmental information of the material subjected to a destructive testing and the environmental information of the target material are input via a input/output interface.

In addition, the method further comprises generating an alert signal based on the predicted LMP value of the target material, via an input/output interface.

In addition, the present disclosure has an effect of quantifying the degradation index for the statistical and geometric features of a phase of the microstructure.

In addition, the present disclosure has an effect of inferring a parameter (average, etc.) of the degradation index even with a small number of images.

BRIEF DESCRIPTION OF THE DRAWINGS

FIG. 2 is a flowchart for describing a degradation prediction method according to an embodiment of the present disclosure.

FIGS. 3A and 3B are flowcharts for describing a degradation prediction method according to another embodiment of the present disclosure.

FIG. 4 is a diagram showing exemplarily illustrating a screen for generating a features index by extracting statistical and geometric features from a microstructure image of a material subjected to a destructive testing according to an embodiment of the present disclosure.

FIG. 5 is a diagram explaining a method of extracting a degradation index and training a prediction model according to an embodiment of the present disclosure.

DETAILED DESCRIPTION

Figure 1:
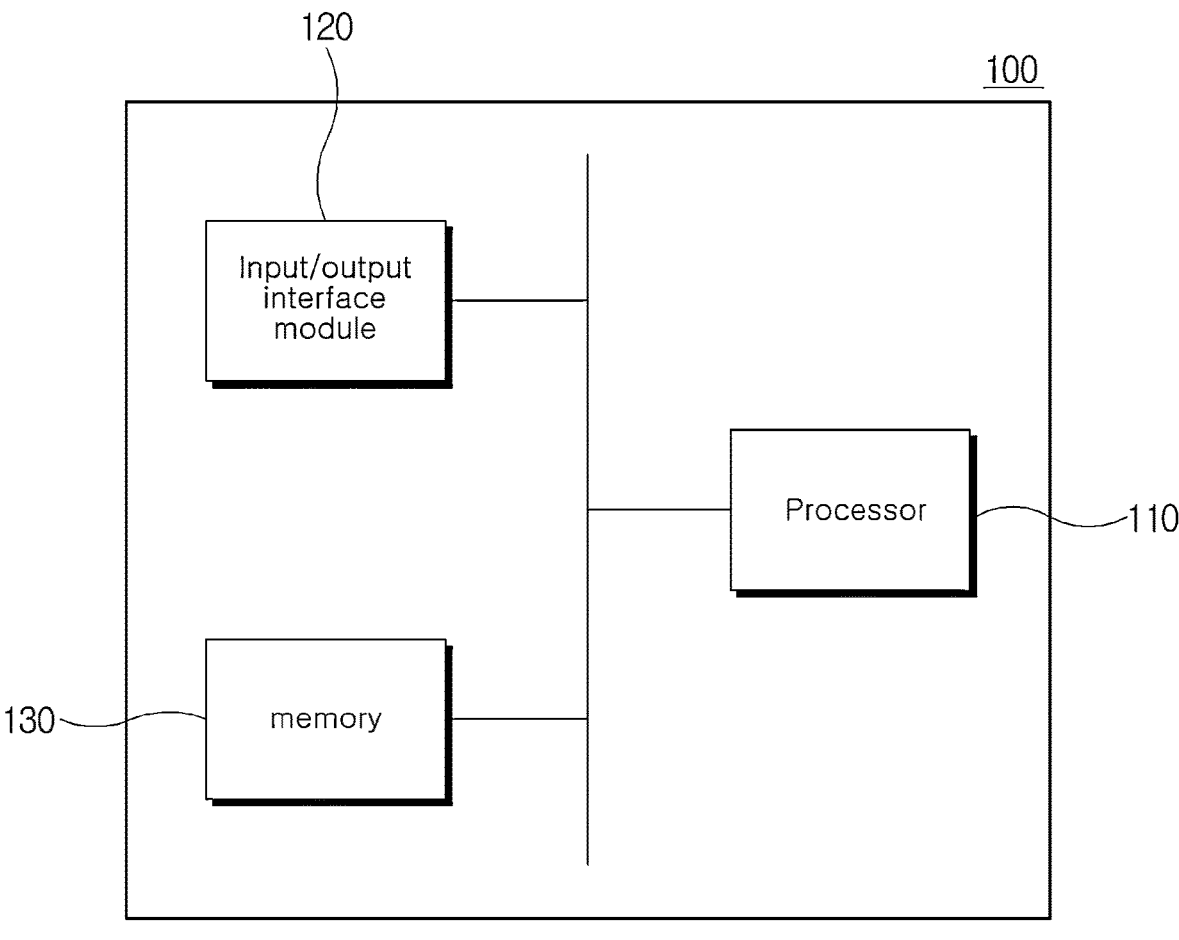
FIG. 1 is a diagram schematically illustrating a configuration of a degradation prediction device according to an embodiment of the present disclosure.

In order to clearly illustrate the present disclosure, parts that may obscure the crux of the present disclosure may be omitted, and like components are denoted by like reference characters throughout the specification.

In the below description, when a part is referred to as being "connected to" another part, it can be "directly connected" to the other part, or it can be "electrically connected" to the other part with another intervening element inserted therebetween unless the context indicates otherwise.

When it is described that any one part is "on" the other part, it may mean that the part is directly on the other part or any other part is interposed therebetween. On the contrary, when it is described that any one part is "directly on" the other part, there is no other part interposed therebetween.

The terms "first", "second", "third", and the like are used to describe various parts, components, areas, layers and/or sections, but are not limited thereto. The use of such ordinal numbers should not be construed as limiting the meaning of the term. For example, the components associated with such an ordinal number should not be limited in the order of use, placement order, or the like. If necessary, each ordinal number may be used interchangeably. Accordingly, a first part, component, region, layer, or section stated below may be referred to as a second part, component, region, layer, or section without departing from the scope of the present disclosure.

The terminology used herein is for the purpose of describing particular embodiments only and is not intended to restrict the scope of the present disclosure. As used herein, the singular forms are intended to include the plural forms as well, unless the context clearly indicates otherwise. It will be further understood that the terms "comprising" and "including" when used in this specification, specify the presence of stated features, regions, integers, steps, operations, elements, and/or components, but do not preclude the presence or addition of one or more other features, regions, integers, steps, operations, elements, and/or components.

Spatially relative terms (e.g., "beneath", "below", "above" and the like) may be used herein for ease of description in describing a relationship between one element and another as illustrated in the figures. It will be understood that these terms are intended to encompass the intended meaning in the figures as well as different meanings or operations of the device in use. For example, if the device in the figures is turned over, elements described as "below" or "beneath" other elements would then be oriented "above" the other elements. Thus, the term "below" can encompass both an orientation that is above, as well as, below according to the context of the disclosure. The device may rotate 90° or at any other angle and the spatially relative terms should be interpreted accordingly.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, with reference to the accompanying drawings, embodiments of the present disclosure will be described in detail with reference drawings so that those of ordinary skill in the art can easily implement them. However, the present disclosure may be embodied in several different forms and is not limited to the embodiments described herein.

FIG. 1 is a diagram schematically illustrating a configuration of a degradation prediction device according to an embodiment of the present disclosure.

Referring to FIG. 1, a degradation (degradation degree, deterioration degree, hereinafter referred to as "degradation") prediction device 100 according to an embodiment includes a processor 110, an input/output interface module 120, and a memory 130.

The processor 110, the input/output interface module 120, and the memory 130 included in the degradation prediction device 100 may be interconnected by a bus, and data can be transmitted to each other.

According to various embodiments, the processor 110 may execute programs or instructions stored in the memory 130. Here, an operation program (e.g., OS) for operating the degradation prediction device 100 may be stored in the memory 130.

According to various embodiments, the processor 110 may execute a program for managing information about the degradation prediction device 100.

According to various embodiments, the processor 110 may execute a program for managing the operation of the degradation prediction device 100.

According to various embodiments, the processor 110 may execute a program for managing the operation of the input/output interface module 120.

① Configuring a Bag of Images

According to various embodiments, the processor 110 may receive a microstructure image of the material on which a destructive testing is performed through the input/output interface module 120. The microstructure image of the material may be captured or taken by image capturing of the material using any photographing device such as a camera or by scanning of the material using any optical sensor. The degradation prediction device may include such photographing device or the optical sensor or may receive the microstructure images from such photographing device or the optical sensor via the input/output interface module 120.

The material may be a metal material. For example, the material may be a material of any component in a gas turbine or a steam turbine, such as a turbine blade/vane or a compressor blade/vane, or a fuel nozzle or any part of the fuel nozzle. Also, the material may be a material of any component in a reformer such tube (e.g., catalyst tube, connection tube). Also, the material may be a material of any component of heat recovery boiler, such as a connection tube, or a tube sheet. Furthermore, the material may be any material of a plant.

The microstructure image may include a microstructure image obtained by changing a photographing angle, exposure, and the like for the material on which the same destructive testing is performed, but is not limited thereto. In other words, multiple microstructure images for the material may be obtained by using different settings such as different angles and different exposures, and the like. The microstructure image may be obtained by photographing or scanning the material. According to an embodiment, the image-capturing or scanning of the material may be performed during the course of or after the destructive testing of the material.

After obtaining or receiving the microstructure images, the processor 110 may analyze and process the microstructure images. For example, the processor 110 may generate a plurality of superpixels from the obtained microstructure image of the material subjected to a destructive testing. The superpixels may be understood as a group of pixels that share common characteristics such as pixel intensity, color, or the brightness. Usually, superpixels have a perceptual meaning since pixels belonging to a given superpixel share similar visual properties. The processor 100 may perform image segmentation to generate the plurality of superpixels from the microstructure images.

According to various embodiments, the processor 110 may recommend segmentation areas based on contours of the plurality of superpixels. Each segmentation may correspond to one of the plurality of superpixels. Such recommendation of the processor 100 may be displayed by the input/output interface module 120. The processor 110 may determine the segmentation areas based on user's input through the input/out interface module 120 or may automatically determine the segmentation areas based on predetermined segmentation criteria.

The processor 110 may determine a label for each recommended segmentation area. The processor 110 may determine a label of each segmentation area recommended based on the user's input to the input/output interface module 120. According to various embodiments, the processor 110 may generate a segmentation training image based on the labeled microstructure image.

According to various embodiments, the processor 110 may configure a bag of images for training based on the generated segmentation training image. According to an embodiment, the processor 110 may generate multiple segmentation training images based on multiple labeled microstructure images. The bag of images for training may be configured based on the generated multiple segmentation training images.

Specifically, the processor 110 may train a segmentation prediction model by obtaining microstructure images of a material subjected to a destructive testing. The processor 110 may configure the bag of images for training using the segmentation prediction model. Once the training of the segmentation prediction model is completed, the processor 110 may generate segmentation prediction images by inputting the microstructure images of the material subjected to a destructive testing to the segmentation prediction model.

The processor 110 may perform labeling on the generated segmentation prediction images. The labeling may be automatically performed based on the multiple labeled microstructure images used for training of the segmentation prediction model. The processor 110 may configure a bag of images for training based on the segmentation prediction images on which labeling is performed.

② Extracting Statistical and Geometric Features of the Microstructure Images According to various embodiments, the processor 110 may extract statistical and geometric features (hereinafter, referred to as "features") of each of microstructure images included in the bag of images by using machine learning or predetermined deep neural networks (DNN). Here, the extracted statistical and geometric features may be a contour perimeter, contour area, convexhull perimeter, convexhull area, aspect ratio, elongation, compactness, solidity, extent, eccentricity, angle, equivalent diameter, and the like, however, the extracted statistical and geometric features are not limited thereto.

According to various embodiments, the processor 110 may extract as many statistical and geometric features as the number of microstructure images included in the bag of images (e.g., 400). However, the number of microstructures images included in the bag of images may vary depending on a material subjected to a destructive testing.

According to various embodiments, the processor 110 may organize the extracted statistical and geometric features according to a predetermined index order. According to various embodiments, the processor 110 may generate a features index of the microstructure image by organizing the extracted statistical and geometric features according to a predetermined index order.

③ Configuring a Bag of Features

According to various embodiments, the processor 110 may configure a bag of features based on statistical and geometric features extracted from each of microstructure images included in the bag of images. The processor 110 may configure a bag of features for statistical and geometric features extracted from each of microstructure images included in the bag of images according to a predetermined index order. The processor 110 may configure a bag of features based on the features index for each of microstructure images included in the bag of images.

④ Training a Predetermined Non-parametric Clustering Model

According to various embodiments, the processor 110 may train a predetermined non-parametric clustering model to cluster statistical and geometric features of each of microstructure images included in the bag of images based on the bag of features. Here, the predetermined non-parametric clustering model may be a Dirichlet process-Gaussian Mixture model (DPGMM), however, the predetermined non-parametric clustering model is not limited thereto.

The processor 110 may train a predetermined non-parametric clustering model to determine at least one significant cluster through a non-parametric clustering on statistical and geometric features of each of microstructure images included in the bag of images. The processor 110 may train the predetermined non-parametric clustering model to identify, when its training is completed, a cluster where the cumulative sum of the clustered weights is equal to or greater than a predetermined threshold value (e.g., 90%) as a significant cluster, when weights by clusters clustered by the predetermined non-parametric clustering model is arranged in a numerical order.

⑤ Determining a Significant Cluster

According to various embodiments, the processor may cluster statistical and geometric features of each of the microstructure images included in the bag of images by using a predetermined non-parametric clustering model when its training is completed.

The processor 110 may identify a cluster whose cumulative sum is equal to or greater than a predetermined threshold value (e.g., 90%) as a significant cluster, when weights by clusters clustered by the predetermined training-completed non-parametric clustering model is arranged in a numerical order.

⑥ Assigning Features to a Significant Cluster (Predicting a Cluster)

According to various embodiments, the processor may obtain additional microstructure images through the input/output interface module 120. The processor 110 extracts statistical and geometric features of additional microstructure images of a material subjected to a destructive testing, by using machine learning or predetermined deep neural networks (DNN). Here, the extracted statistical and geometric features may be a contour perimeter, contour area, convexhull perimeter, convexhull area, aspect ratio, elongation, compactness, solidity, extent, eccentricity, angle, equivalent diameter, and the like, however, the extracted statistical and geometric features are not limited thereto.

The processor 110 may extract as many statistical and geometric features as the number of microstructures included in the additional microstructure images of a material subjected to a destructive testing (e.g., 400). However, the number of microstructures included in the additional microstructure images of the material subjected to a destructive testing may vary depending on a material subjected to a destructive testing.

According to various embodiments, the processor 110 may organize the extracted statistical and geometric features according to a predetermined index order. The processor may generate a features index of the additional microstructure images by organizing the extracted statistics and geometric features according to the predetermined index order.

The processor 110 assigns the statistical and geometric features of the additional microstructure images to at least one significant cluster determined by a predetermined training-completed non-parametric clustering model, by using the predetermined training-completed non-parametric clustering model.

According to various embodiments, the processor 110 may assign the statistical and geometric features of each of microstructure images included in the bag of images to at least one significant cluster determined by a predetermined training-completed non-parametric clustering model, by using the predetermined training-completed non-parametric clustering model.

⑦ Extracting a Degradation Index

According to various embodiments, the processor 110 may assign features values of different microstructures in the additional microstructure images to at least one significant cluster.

Specifically, the processor 110 may generate a degradation index by dividing a weighted average of expected values of cluster averages, assigned to different microstructures in the additional microstructure images, by the total count (i.e., number) of different microstructures present in the image. To note, the total count (i.e., number) of different microstructures present in an image may vary depending on a material subjected to a destructive testing. The processor 110 may assign features values of different microstructures in each of the microstructure images included in the bag of images to at least one significant cluster.

According to an embodiment, the processor 110 may generate a degradation index by dividing a weighted average of expected values of cluster averages, assigned different microstructures in each of microstructure images included in the bag of images, by the total count of different microstructures present in the image. To note, the total count of different microstructures present in the image may vary depending on a material subjected to a destructive testing.

According to an embodiment, the processor 110 may extract a degradation index of the additional microstructure images and each of microstructure images included in the bag of images, by using Equation 1 below, based on the expected values of the statistical and geometric features assigned to the at least one significant cluster.

⑨ Training a Degradation Index Prediction Model

According to various embodiments, the processor 110 may obtain environmental information of a material subjected to a destructive testing through the input/output interface module 120. Here, the environmental information of a material subjected to a destructive testing may be temperature (K), stress (MPa), exposure time (hrs), and the like, that the material experiences, but is not limited thereto.

The processor 110 may train a degradation index prediction model based on the representative value of a degradation index of a material by environmental conditions and the environmental information of a material subjected to a destructive testing. Here, the degradation index prediction model may be a Bayesian regression model, but is not limited thereto.

The processor 110 may train a degradation index prediction model by setting an explanatory variable as environmental information of a material subjected to a destructive testing and a reaction variable as a representative value of a degradation index of a material by environmental conditions.

According to various embodiments, the processor 110 may train the degradation index prediction model such that the degradation index is output when the environmental information of a material is input.

⑩ Training a LMP (Larson-Miller Parameter) Value Prediction Model

According to various embodiments, the processor 110 may obtain a theoretical value of a LMP (Larson-Miller Parameter, hereinafter referred to as "LMP") when conducting a destructive testing through the input/output interface module 120. Here, the LMP is a physical parameter representing a lifespan of a material, and the prediction of a lifespan of a material from the image described below is not necessarily applied only to obtaining a theoretical value of

[Equation 1]

$$\text{Degradation Index} = \frac{\sum (* \text{ weight} \times \text{ expected value of an average of a cluster to which } \gamma' \text{ is assigned})}{\text{total number of } \gamma' \text{ present in an image}}$$

$$*\text{weight} = \frac{\text{the number of } \gamma' \text{ located in the cluster}}{\text{total number of } \gamma' \text{ having an assigned cluster in the image}}$$

Here, $\gamma'$ may mean a structure phase of a material to be analyzed that indicates deterioration of the material.

⑧ Setting a Representative Value of the Degradation Index

According to various embodiments, the processor 110 may obtain an average of the extracted degradation index. Also, the processor 110 may obtain an environmental information of a material subjected to a destructive testing. Furthermore, the processor 110 may set a representative value of the degradation index by environmental conditions, through sampling of an average of the degradation index using the predetermined model based on the environmental information of a material subjected to a destructive testing. The predetermined model may be a Bayesian model, but is not limited thereto.

an LMP, and other physical parameter representing the lifespan of a material may be applied in the same way.

The processor may train a LMP value prediction model based on the representative value of a degradation index of a material by environmental conditions and a theoretical value of LMP at a destructive testing. Here, the LMP value prediction model may be a Bayesian regression model, but is not limited thereto.

Also, the processor 110 may train a LMP value prediction model by setting an explanatory variable as a representative value of a degradation index of a material by environmental conditions and a reaction variable as a theoretical value of LMP at a destructive testing. Furthermore, the processor 110 may train the LMP value prediction model such that the LMP value is output when the degradation index is input.

⑪ Predicting a Degradation Index and a LMP
Value of a Target Material

According to various embodiments, the processor may obtain environmental information of a target material through the input/output interface module 120. Here, the environmental information of target material may be temperature (K), stress (MPa), exposure time (hrs), and the like, that the material experience, but is not limited thereto. The target material is a same type of material with the material subjected to a destructive testing.

The processor 110 may predict a degradation index for the target material using the training-completed degradation index prediction model. Here, the training-completed degradation index prediction model may be a Bayesian regression model, but is not limited thereto.

The processor 110 may predict a LMP value of the target material by inputting a degradation index of the target material predicted by the training-completed degradation index prediction model to the LMP value prediction model for which the training is completed. Here, the training-completed LMP value prediction model may be a Bayesian regression model, but is not limited thereto.

⑫ Verifying a LMP Value of the Target Material

According to various embodiments, the processor 110 may obtain a LMP value predicted based on a microstructure image of a replica through the input/output interface module 120.

The processor 110 may verify a LMP value of the target material predicted by a training-completed LMP value prediction model by comparing a predicted LMP value predicted based on a microstructure image of a replica with the predicted LMP value of the target material predicted by a training-completed LMP value prediction model.

The input/output interface module 120 may be connected to an external device (e.g., a server) through a network. The input/output interface module 120 may obtain data from an external device through the network. The input/output interface module 120 may obtain a microstructure image of a material subjected to a destructive testing through the network.

The input/output interface module 120 may include a screen to display information. The input/output interface module 120 may display the generated training image. The input/output interface module 120 may display statistical and geometric features extracted by the processor 110. The input/output interface module 120 may display a features index generated by the processor 110.

The input/output interface module 120 may obtain additional microstructure images. The input/output interface module may include various sensors and/or photographing devices capturing images or scanning of the material.

The input/output interface module 120 may obtain environmental information of a material subjected to a destructive testing. The input/output interface module 120 may obtain LMP theoretical values for a destructive testing. The input/output interface module 120 may obtain environmental information of the target material. The input/output interface module 120 may obtain a predicted LMP value based on a microstructure image of a replica.

The input/output interface module 120 may obtain a user's input. The input/output interface module 120 may be integrally provided with the degradation prediction device. The input/output interface module 120 may be provided separately from the degradation prediction device. The input/output interface module 120 may be a separate device to be communicatively connected to the degradation prediction device. The input/output interface module 120 may include a port (e.g., a USB port) for connection with an external device.

The input/output interface module 120 may include display devices such as a monitor, touch screen or touch pad, and user input devices such as touch screen, mouse, electronic pen, microphone, keyboard, speaker, earphone, headphone, or touch pad. The input/output interface module 120 may receive the information through such user-input devices.

The memory 130 may store a microstructure image of a material subjected to a destructive testing obtained through the input/output interface module 120. The memory 130 may store a training image generated by the processor 110. The memory 130 may store statistical and geometric features extracted by the processor 110. The memory 130 may store a features index generated by the processor 110. The memory 130 may store additional microstructure images. The memory 130 may store environmental information of a material subjected to a destructive testing. The memory 130 may store a theoretical value of LMP at a destructive testing. The memory 130 may store a degradation index generated by the processor 110. The memory 130 may store a representative value of a degradation index generated by the processor 110. The memory 130 may store a LMP value generated by the processor 110. The memory 130 may store environmental information of the target material. The memory 130 may store a verified LMP value.

Upon determining and verifying the LMP value of the material, the degradation prediction device may display the LMP value. The LMP may be displayed on the input/output interface module 120. the degradation prediction device may display, on the input/output interface 120, information regarding a lifetime of the material based on the LMP.

According to an embodiment, the degradation device may store a predetermined range for a normal LMP value. If the determined and verified LMP value is out of the predetermined range, the degradation device may indicate a sound or visual risk alarm via the input/output interface module 120. According to an embodiment, if the determined and verified LMP value is within the predetermined range but close to a boundary value of the predetermined range by only a predetermined difference, the degradation device may indicate a sound or visual caution alarm via the input/out interface 120. The visual risk alarm or the caution alarm may include a visual signal or text indicating a need for replacement of a component.

According to the present disclosure, a degradation index and an LMP value of a material of a component may be predicted without a need to destroy the material. More specifically, a degradation index and an LMP value of a material of a component may be predicted based on microstructure images previously obtained through a destructive testing and environmental information that a material (a same type of material) of the component experienced. Therefore, when the degradation prediction device and method is applied to a plant using a component subject to high temperature and high pressure like blades, vanes, fuel nozzles, tubes in a gas turbine or elements in a reformer and a heat recovery system, the degradation prediction device may provide an alert for potentially risky or caution-requiring states of these components. This alert is generated based on LMP (Larson-Miller Parameter) prediction value and/or lifetime prediction value of the material used in these components. Such predictions are made using environmental information such as temperature (K), stress (MPa), exposure time (hrs) data that the respective components encounter. This also allows a chance to replace or repair the component that uses the material before the component fails; thus, improving the stability and security of the plant or system.

FIG. 2 is a flow chart for describing a degradation prediction method according to an embodiment of the present disclosure. The degradation prediction method may be performed by a processor of a computer system, when it executes instructions in a software program stored in a memory. The computer system may include an input interface, an output interface as well as sensors and photographing devices.

Referring to FIG. 2, a degradation prediction method includes configuring a bag of images (S200), extracting statistical and geometric features and determining a significant cluster using a non-parametric clustering (S210), setting a representative value of a degradation index of a material by environmental conditions (S220), training a degradation index prediction model (S230), training a LMP value prediction model (S240), predicting a degradation index and a LMP value of a target material (S250), and verifying a LMP value of the target material (S260).

In step S200, the degradation prediction device may configure a bag of images of one microstructure image of a material subjected to a destructive testing.

Specifically, the degradation prediction device may receive/obtain a microstructure image, analyze the obtained microstructure image and generate a plurality of superpixels in an obtained microstructure image of a material subjected to a destructive testing. The microstructure of the material subjected to a destructive testing, may be captured, photographed or scanned during a course of or after the destructive testing of the material.

Then, the degradation prediction device may recommend each segmentation area based on a contour of each of the plurality of superpixels. Then, the degradation prediction device may receive user's input, label each recommended segmentation area based on the user's input, and generate a labeled microstructure image of the material.

Then, the degradation prediction device may generate a segmentation training image based on the labeled microstructure image of the material subjected to a destructive testing.

According to an embodiment, the degradation prediction device may configure the bag of images based on a single microstructure image of a material by repeatedly performing the steps of generating superpixels, generating a labeled microstructure image, and generating a segmentation training image. Alternatively, the degradation prediction device may configure the bag of images based on multiple microstructure images of a material by performing the steps of generating superpixles, generating a labeled microstructure image, and generating a segmentation training image, for each of the multiple microstructure images.

In step S210, the degradation prediction device may extract statistical and geometric features of each of microstructure images included in the bag of images_by using machine learning or predetermined deep neural networks (DNN). Specifically, the degradation prediction device may extract as many statistical and geometric features as the number (i.e., count) of microstructures included in each of microstructure images of the material subjected to a destructive testing (e.g., 400). The number of microstructures included in each of microstructure images of the material subjected to a destructive testing may vary depending on a material subjected to a destructive testing.

According to an embodiment, the extraction of the statistical and geometric features of each of microstructure in the microstructure images may be performed based on the segmentation in the segmentation training images in step S200. The statistical and geometric features of a microstructure may include a contour perimeter, contour area, convexhull perimeter, convexhull area, aspect ratio, elongation, compactness, solidity, extent, eccentricity, angle, equivalent diameter of the microstructure.

In step S210, the degradation prediction device may also generate a features index of microstructure images of the material subjected to a destructive testing by organizing the extracted statistics and geometric features according to a predetermined index order. Then, the degradation prediction device may configure a bag of features based on the statistical and geometric features extracted from microstructure images of the material subjected to a destructive testing and features index of the microstructure images of the material.

Furthermore, in step S210, the degradation prediction device may conduct a training of a predetermined non-parametric clustering model. This training aims to identify at least one significant cluster through a non-parametric clustering on statistical and geometric features of each of microstructure images included in the bag of images.

Then, the degradation prediction device also may identify a cluster as a significant cluster, if its cumulative sum is equal to or greater than a predetermined threshold value (e.g., 90%). This determination is made based on the arrangement of weights assigned to clusters clustered by the predetermined non-parametric clustering model following its completed training, and this arrangement is conducted in a numerical order.

In step S220, the degradation prediction device may extract statistical and geometric features of additional (i.e., new) microstructure images by using the machine learning or the predetermined deep neural networks (DNN).

Then, the degradation prediction device may assign the statistical and geometric features of the additional microstructure images to at least one significant cluster determined by the predetermined training-completed non-parametric clustering model. This allocation is carried out using the predetermined training-completed non-parametric clustering model.

Also, the degradation prediction device may assign the statistical and geometric features of each of microstructure images included in the bag of images to at least one significant cluster determined by the predetermined training-completed non-parametric clustering model. This allocation is carried out using the predetermined training-completed non-parametric clustering model.

Then, the degradation prediction device may determine a degradation index for each images included in the bag of images and the additional microstructure images using Equation 2 below. This determination may be performed based on an expected value of statistical and geometric features assigned to the at least one significant cluster.

[Equation 2]

$$\text{Degradation Index} = \frac{\sum(* \text{ weight} \times \text{expected value of an average of a cluster to which } \gamma' \text{ is assigned})}{\text{total number of } \gamma' \text{ present in an image}}$$

$$*\text{weight} = \frac{\text{the number of } \gamma' \text{ located in the cluster}}{\text{total number of } \gamma' \text{ having an assigned cluster in the image}}$$

Here, $\gamma'$ may mean a total number of microstructures in each of the images included in the bag of images and the additional microstructure images. $\gamma'$ may vary depending on a material subjected to a destructive testing.

Then, the degradation prediction device may set a representative value of the degradation index of the material by environmental conditions using a predetermined model based on an environmental information of the material subjected to a destructive testing. Here, the predetermined model may be a Bayesian sampling inference model, but is not limited thereto.

In step S230, the degradation prediction device may train a degradation index prediction model based on the representative value of a degradation index of a material by environmental conditions and the environmental information of the material subjected to a destructive testing. Specifically, the degradation index prediction model is trained by setting an explanatory variable as environmental information of the material subjected to a destructive testing and a reaction variable as a representative value of the degradation index of the material by environmental conditions. Thereby, as an outcome of step S230, a trained degradation index prediction model is produced.

In step S240, the degradation prediction device may train a LMP value prediction model based on a representative value of a degradation index of the material by environmental conditions and a theoretical value of LMP at a destructive testing. Specifically, the LMP value prediction model is trained by setting an explanatory variable as a representative value of a degradation index of a material by environmental conditions and a reaction variable as a theoretical value of LMP at a destructive testing.

In step S250, the degradation prediction device may predict a degradation index of the target material by using the training-completed degradation index prediction model. Also, the degradation prediction device may predict a LMP value of the target material by inputting a degradation index of the target material predicted by the training-completed degradation index prediction model to the training-completed LMP value prediction model. The target material is a same type of material with the material subjected to a destructive testing.

In step S260, the degradation prediction device may verify the LMP value of the target material predicted by the training-completed LMP value prediction model, by comparing a predicted LMP value predicted based on a microstructure image of a replica with the LMP value of the target material predicted by the training-completed LMP value prediction model.

After step S260, upon determining and verifying the LMP value of the material, the degradation prediction device may display the LMP value. The LMP may be displayed on the input/output interface module 120.

According to an embodiment, the degradation device may store a predetermined range for a normal LMP value. If the determined and verified LMP value is out of the predetermined range, the degradation device may indicate a sound or visual risk alarm via the input/output interface module 120. According to an embodiment, If the determined and verified LMP value is within the predetermined range but close to a boundary value of the predetermined range by only a predetermined difference, the degradation device may indicate a sound or visual caution alarm via the input/out interface 120. The visual risk alarm or the caution alarm may include a visual signal or text indicating a need for replacement of a component.

According to the present disclosure, a degradation index and an LMP value of a material of a component may be predicted without a need to destroy the material. More specifically, a degradation index and an LMP value of a material of a component may be predicted based on microstructure images previously obtained through a destructive testing and environmental information that the material of the component experienced. Therefore, when the degradation prediction device and method is applied to a plant using a component subject to high temperature and high pressure like blades, vanes, fuel nozzles, tubes in a gas turbine or elements in a reformer and a heat recovery system, the degradation prediction device may provide an alert for potentially risky or caution-requiring states of these components. This alert is generated based on LMP (Larson-Miller Parameter) prediction value and/or lifetime prediction value of the material used in these components. Such predictions are made using environmental information such as temperature (K), stress (MPa), exposure time (hrs) data that the respective components encounter. This also allows a chance to replace the component using the material before the component fails; thus, improving the stability and security of the plant or system.

FIGS. 3A and 3B are flowcharts for describing a degradation prediction method according to another embodiment of the present disclosure.

Referring to FIGS. 3A and 3B, the degradation prediction method includes configuring a bag of images (S300), extracting statistical and geometric features (S302), configuring a bag of features (S304), training a predetermined non-parametric clustering model (S306), determining a significant cluster (S308), assigning statistical and geometric features to the significant cluster determined by the predetermined non-parametric clustering model (S310), extracting a degradation index (S312), setting a representative value of the degradation index of a material by environmental conditions (S314), training a degradation index prediction model (S316), training a LMP value prediction model (S318), predicting a degradation index and a LMP value of a target material (S320), and verifying a LMP value of the target material (S322).

In step S300, the degradation prediction device may receive/obtain a microstructure image, analyze the obtained microstructure image and generate a plurality of superpixels from the obtained microstructure image of the material subjected to a destructive testing. The microstructure of the material subjected to a destructive testing, may be captured, photographed or scanned during a course of or after the destructive testing of the material. Then, the degradation prediction device may recommend each segmentation area based on a contour of each of the plurality of superpixels. Then, the degradation prediction device may determine a label for each recommended segmentation area.

In step S300, the degradation prediction device may receive user's input and label each segmentation area recommended based on the user's input. The degradation prediction device may generate a segmentation training image based on the labeled microstructure image of the material subjected to a destructive testing.

In step S302, the degradation prediction device may extract statistical and geometric features of each of microstructure images included in the bag of images by using machine learning or predetermined deep neural networks (DNN). Specifically, the degradation prediction device may extract as many statistical and geometric features as the number (i.e., count) of microstructures included in each of microstructure images with respect to each of microstructure images included in the bag of images (e.g., 400). The number of microstructures included in each of microstructure images of the material subjected to a destructive testing may vary depending on a material subjected to a destructive testing.

In step S302, the degradation prediction device may also generate a features index of each of microstructure images included in the bag of images by organizing the extracted statistics and geometric features according to the predetermined index order.

In step S304, the degradation prediction device may configure a bag of features based on the statistical and geometric features extracted from each of microstructure images included in the bag of images and features index of the microstructure images included in the bag of images.

In step S304, the degradation prediction device may configure a bag of features based on the features index of each of microstructure images included in the bag of images.

In step S306, the degradation prediction device may conduct a training of a predetermined non-parametric clustering model. This training aims to identify at least one significant cluster through a non-parametric clustering on statistical and geometric features of each of microstructure images included in the bag of images.

In step S306, the degradation prediction device may also train the predetermined non-parametric clustering model to microstructure images included in the bag of images by using the predetermined training-completed non-parametric clustering model.

In step S308, the degradation prediction device may determine a cluster as a significant cluster, if its cumulative sum is equal to or greater than a predetermined threshold value (e.g., 90%). This determination is made based on the arrangement of weights assigned to clusters clustered by the predetermined non-parametric clustering model, and this arrangement is conducted in a numerical order.

In step S310, the degradation prediction device may extract statistical and geometric features of each of microstructure images included in the bag of images by using the machine learning or the predetermined deep neural networks (DNN).

Then, the degradation prediction device may extract as many statistical and geometric features as the number of microstructures included in additional microstructure images (e.g., 400). The number of microstructures included in each of microstructure images may vary depending on a material subjected to a destructive testing.

In step S310, the degradation prediction device may generate a features index of the additional microstructure images by organizing the extracted statistics and geometric features according to the predetermined index order.

In step S310, the degradation prediction device may assign statistical and geometric features of the additional microstructure images to at least one significant cluster determined by the predetermined training-completed non-parametric clustering model, using the predetermined training-completed non-parametric clustering model for which training is completed.

Also, the degradation prediction device may assign statistical and geometric features of each of microstructure images included in a bag of images to at least one significant cluster determined by a predetermined training-completed non-parametric clustering model. This allocation is carried out using a predetermined training-completed non-parametric clustering model.

In step S312, the degradation prediction device may determine a degradation index for each of microstructure images included in the bag of images and the additional microstructure images using Equation 3 below. This determination may be performed based on an expected value of statistical and geometric features assigned to the at least one significant cluster.

[Equation 3]

$$\text{Degradation Index} = \frac{\sum (* \text{ weight} \times \frac{\text{expected value of an average of a cluster to which } \gamma' \text{ is assigned}}{\text{total number of } \gamma' \text{ present in an image}}}{}$$

$$* \text{weight} = \frac{\text{the number of } \gamma' \text{ located in the cluster}}{\text{total number of } \gamma' \text{ having an assigned cluster in the image}}$$

identify a cluster as a significant cluster, if its cumulative sum is equal to or greater than a predetermined threshold value (e.g., 90%). This determination is made based on the arrangement of weights assigned to clusters clustered by the predetermined non-parametric clustering model following its completed training, and this arrangement is conducted in a numerical order.

In step S308, the degradation prediction device may cluster statistical and geometric features of each of the Here, $\gamma'$ may mean a structure phase of a material to be analyzed that indicates deterioration of the material.

In step S314, the degradation prediction device may set a representative value of the degradation index of the material by environmental conditions by sampling an average of the degradation index, using a predetermined model based on environmental information of the material subjected to a destructive testing.

In step S316, the degradation prediction device may train a degradation index prediction model based on the representative value of a degradation index of a material by environmental conditions and the environmental information of the material subjected to a destructive testing. Specifically, the degradation index prediction model is trained by setting an explanatory variable as environmental information of the material subjected to a destructive testing and a reaction variable as a representative value of the degradation index of the material by environmental conditions. Thereby, as an outcome of step S316, a trained degradation index prediction model is produced.

In step S318, the degradation prediction device may train a LMP value prediction model based on a representative value of a degradation index of the material by environmental conditions and a theoretical value of LMP at a destructive testing. Specifically, the LMP value prediction model is trained by setting an explanatory variable as a representative value of a degradation index of a material by environmental conditions, and a reaction variable as a theoretical value of LMP at a destructive testing.

In step S320, the degradation prediction device may predict a degradation index for the target material using the training-completed degradation index prediction model. Also, the degradation prediction device may predict a LMP value of the target material by inputting a degradation index of the target material predicted by the training-completed degradation index prediction model to the training-completed LMP value prediction model.

In step S322, the degradation prediction device may verify the LMP value of the target material predicted by the training-completed LMP value prediction model by comparing a predicted LMP value predicted based on a microstructure image of a replica with the predicted LMP value of the target material predicted by the training-completed LMP value prediction model.

FIG. 4 is a diagram showing exemplarily illustrating an exemplary screen for generating a features index by extracting statistical and geometric features from a microstructure image of a material subjected to a destructive testing according to an embodiment of the present disclosure.

Referring to FIG. 4, a plurality of microstructures may be included in microstructure images 400 of a material subjected to a destructive testing obtained by the degradation prediction device. The microstructure images 400 including the plurality of microstructures may be displayed by the input/output interface module 120.

Then, the degradation prediction device may extract a plurality of features 401 and 402 from obtained microstructure images 400 of the material subjected to a destructive testing. Here, the extracted statistical and geometric features may be a contour perimeter, contour area, convexhull perimeter, convexhull area, aspect ratio, elongation, compactness, solidity, extent, eccentricity, angle, equivalent diameter and the like, however, the extracted statistical and geometric features are not limited thereto. The example of statistical and geometric features extracted by the degradation prediction device are shown in statistical and geometric features 410.

According to various embodiments, the degradation prediction device may extract as many statistical and geometric features as the number of microstructures with respect to one image. Here, the number of microstructures may vary depending on the material on which a destructive testing is performed.

Then, the degradation prediction device may generate a features index 420 based on the extracted statistical and geometric features 410. The features index 420 is generated so as to include features such as a contour perimeter, contour area, convexhull perimeter, convexhull area, aspect ratio, elongation, compactness, solidity, extent, eccentricity, angle, and equivalent diameter.

FIG. 5 is a diagram explaining a method of extracting a degradation index and training a prediction model according to an embodiment of the present disclosure.

Referring to FIG. 5, the degradation prediction device may extract statistical and geometric features 511 from a segmentation training image 501 included in a bag of images that is intended for training. (S510)

Then, the degradation prediction device may train a predetermined non-parametric clustering model to determine at least one significant cluster 521 through a clustering on statistical and geometric features (S520). Here, the predetermined non-parametric clustering model may be a Dirichlet process-Gaussian Mixture model (DPGMM), but is not limited thereto.

Then, the degradation prediction device may obtain additional images, and assign each of the statistical and geometric features to a significant cluster 531 using the obtained additional images and a predetermined training-completed non-parametric clustering model (S530). At this time, statistical and geometric features that are not assigned to the significant cluster may be omitted.

According to various embodiments, the degradation prediction device may extract a degradation index for each of images included in the bag of images and the additional microstructure images using Equation 4 below. The extraction of the degradation index is performed based on an expected value of statistical and geometric features assigned to the at least one significant cluster. (S540)

[Equation 4]

$$\text{Degradation Index} = \frac{\sum (* \text{weight} \times \text{expected value of an average of a cluster to which } \gamma' \text{ is assigned})}{\text{total number of } \gamma' \text{ present in an image}}$$

$$^*\text{weight} = \frac{\text{the number of } \gamma' \text{ located in the cluster}}{\text{total number of } \gamma' \text{ having an assigned cluster in the image}}$$

Here, $\gamma'$ may mean a structure phase of a material to be analyzed that indicates deterioration of the material.

Then, the degradation prediction device may set a representative value of a degradation index of a material by environmental conditions through sampling of an average of the degradation index using the predetermined model based on the environmental information of a material subjected to a destructive testing. (S550)

Then, degradation prediction device may train a degradation index prediction model based on the representative value of a degradation index of a material by environmental conditions 502 and the environmental information of a material subjected to a destructive testing (S560). Here, the environmental information 502 of a material subjected to a destructive testing may be temperature (K), stress (MPa), exposure time (hrs), and the like, but is not limited thereto.

According to various embodiments, the degradation prediction device may train a LMP value prediction model based on a representative value of a degradation index of a material by environmental conditions and a theoretical value of LMP at a destructive testing 503. (S570)

Figure 6:
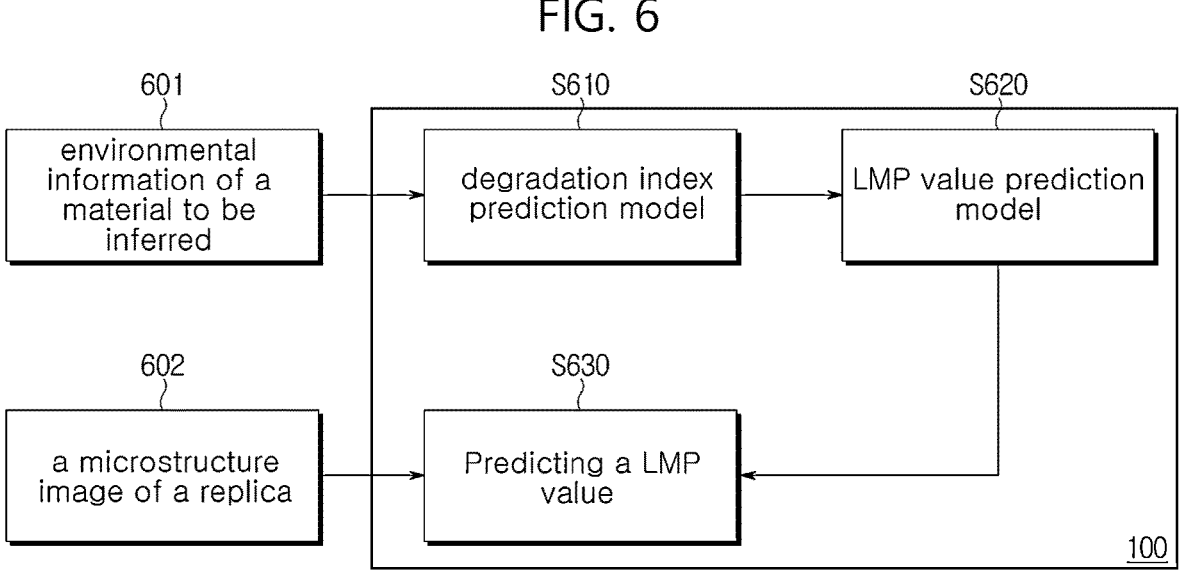
FIG. 6 is a diagram describing a method of predicting a LMP value of a target material according to an embodiment of the present disclosure.

FIG. 6 is a diagram showing a method of predicting a LMP value of a target material according to an embodiment of the present disclosure.

Referring to FIG. 6, the degradation prediction device may predict a prediction index of the target material by using a training-completed degradation index prediction model, based on environmental information 601 of the target material. (S610) Here, the environmental information 601 of the target material may be temperature (K), stress (MPa), exposure time (hrs), and the like, but is not limited thereto.

Then, the degradation prediction device may predict a LMP value of the target material by inputting a degradation index of the target material predicted by the training completed degradation index prediction model to the training completed LMP value prediction model. (S620)

Then, the degradation prediction device may verify a LMP value of the target material predicted by the training-completed LMP value prediction model by comparing a predicted LMP value predicted based on a microstructure image of a replica (602) with the predicted LMP value of the target material predicted by the training-completed LMP value prediction model. (S630)

Although the present disclosure has been described with reference to the embodiments illustrated in the drawings, this is merely exemplary. Also, it is noted that any one feature of an embodiment of the present disclosure described in the specification may be applied to another embodiment of the present disclosure. It will be understood by those skilled in the art that various modifications and equivalent embodiments thereto may be implemented. Accordingly, the true technical protection scope of the present disclosure should be determined by the following claims.

What is claimed is:

1. A degradation prediction device for a target material of a component in a plant comprising:
   at least one processor;
   an input/output interface; and
   a memory configured to store a program,
   wherein the at least one processor is configured to, when executing instructions in the program:
      configure a bag of images for training based on a microstructure image of the material subjected to a destructive testing;
      extract features of each image included in the bag of images,
      determine at least one significant cluster through clustering on the extracted features of each image included in the bag of images using a predetermined non-parametric clustering model;
      extract at least one degradation index by assigning features of additional microstructure images and the features of each image included in the bag of images subjected to the clustering to the determined at least one significant cluster using the predetermined non-parametric clustering model,
      set a representative value of a degradation index of the material by environmental conditions based on the extracted degradation index and an environmental information of the material;
   train a degradation index prediction model based on the representative value of the degradation index of the material by environmental conditions and the environmental information of the material;
   train a LMP (Larson-Miller Parameter) value prediction model based on the representative value of the degradation index of the material by the environmental conditions and a theoretical value of LMP at a destructive testing;
   predict a degradation index for the target material using the degradation index prediction model for which training is completed based on environmental information of the target material; and
   predict a LMP value of the target material using the LMP value prediction model for which training is completed based on the predicted degradation index for the target material.

2. The degradation prediction device of claim 1,
wherein the at least one processor is configured to verify the LMP value of the target material by comparing a LMP value predicted based on a microstructure image of a replica with the predicted LMP value of the target material.

3. The degradation prediction device of claim 1,
wherein the at least one processor is configured to configure the bag of images for training based on a predetermined segmentation prediction model.

4. The degradation prediction device of claim 1,
wherein the at least one processor is further configured to:
   extract statistical and geometric features of each of the microstructure images;
   configure a bag of features based on the extracted statistical and geometric features of each of the microstructure images;
   train the predetermined non-parametric clustering model to determine at least one significant cluster through a clustering on statistical and geometric features of each image included in the bag of images, based on the configured bag of features; and
   determine at least one significant cluster through a clustering on statistical and geometric features of each image included in the bag of images using the predetermined non-parametric clustering model for which training is completed.

5. The degradation prediction device of claim 4,
wherein the at least one processor is configured to
   assign the statistical and geometric features of each image included in the bag of images subjected to the clustering and the additional microstructure images to at least one significant cluster determined by the predetermined non-parametric clustering model for which training is completed, using the predetermined non-parametric clustering model for which training is completed;
   extract a degradation index for each of images included in the bag of images and the additional microstructure images using a predetermined method based on an expected value of statistical and geometric features assigned to the at least one significant cluster; and
   set a representative value of a degradation index of a material by environmental conditions using a predetermined model based on an average of the extracted degradation index.

6. The degradation prediction device of claim 1, wherein the environmental information of the material subjected to a destructive testing and the environmental information of the target material are input via the input/output interface.

7. The degradation prediction device of claim 1, wherein the at least one processor is further configured to generate an alert signal based on the predicted LMP value of the target material via the input/output interface.

8. A method for predicting degradation of a target material of a component in a plant, comprising:

configuring a bag of images for training based on a microstructure image of the material subjected to a destructive testing;

extracting features of each image included in the bag of images, determining at least one significant cluster through a clustering on the extracted features of each image included in the bag of images using a predetermined non-parametric clustering model;

extracting a degradation index by assigning features of additional microstructure images and the features of each image included in the bag of images subjected to the clustering to the determined at least one significant cluster using the predetermined non-parametric clustering model, setting a representative value of a degradation index of the material by environmental conditions based on the extracted degradation index and an environmental information of the material;

training a degradation index prediction model based on the representative value of the degradation index of the material by environmental conditions and the environmental information of the material;

training a LMP value prediction model based on the representative value of the degradation index of the material by the environmental conditions and a theoretical value of LMP at a destructive testing;

predicting a degradation index for the target material using the degradation index prediction model for which training is completed based on environmental information of the target material; and predicting a LMP value of the target material using the LMP value prediction model for which training is completed based on the predicted degradation index for the target material.

9. The method for predicting degradation of a target material of claim 8, further comprising:

verifying the LMP value of the target material by comparing a LMP value predicted based on a microstructure image of a replica with the predicted LMP value of the target material.

10. The method for predicting degradation of a target material of claim 8, wherein the configuring a bag of images for training comprises configuring the bag of images for training based on a predetermined segmentation prediction model.

11. The method for predicting degradation of a target material of claim 8, wherein the determining at least one significant cluster through a clustering on features of each image included in the bag of images comprises:

extracting statistical and geometric features of each of the microstructure images;

configuring a bag of features based on the extracted statistical and geometric features of each of the microstructure images;

training a predetermined non-parametric clustering model to determine at least one significant cluster through a clustering on statistical and geometric features of each image included in the bag of images, based on the configured bag of features; and determining at least one significant cluster through a clustering on statistical and geometric features of each image included in the bag of images using the predetermined non-parametric clustering model for which training is completed.

12. The method for predicting degradation of a target material of claim 11, wherein the setting a representative value of a degradation index of a material by environmental conditions comprises:

assigning the statistical and geometric features of each image included in the bag of images subjected to the clustering and the additional microstructure images to at least one significant cluster determined by the predetermined non-parametric clustering model for which training is completed, using the predetermined non-parametric clustering model for which training is completed;

extracting a degradation index for each of images included in the bag of images and the additional microstructure images using a predetermined method based on an expected value of statistical and geometric features assigned to the at least one significant cluster; and setting a representative value of a degradation index of a material by environmental conditions using a predetermined model based on an average of the extracted degradation index.

13. The method for predicting degradation of a target material of claim 8, wherein the environmental information of the material subjected to a destructive testing and the environmental information of the target material are input via a input/output interface.

14. The method for predicting degradation of a target material of claim 8, further comprising:

generating an alert signal based on the predicted LMP value of the target material, via an input/output interface.

15. A non-transitory computer-readable storage medium having stored thereon a computer program to execute a method of claim 8.

\* \* \* \* \*